(12) United States Patent  
Forutanpour

(10) Patent No.: US 7,724,947 B2
(45) Date of Patent: May 25, 2010

(54) REMOVAL OF BACKGROUND IMAGE FROM WHITEBOARD, BLACKBOARD, OR DOCUMENT IMAGES

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 884 days.

(21) Appl. No.: 11/533,692

(22) Filed: Sep. 20, 2006

(65) Prior Publication Data

US 2008/0069441 A1 Mar. 20, 2008

(51) Int. Cl.
 *G06K 9/34* (2006.01)
(52) U.S. Cl. ....................... 382/164; 382/242
(58) Field of Classification Search ................. 382/164, 382/242; 358/448; 375/E7.081, E7.03
See application file for complete search history.

(56) References Cited

U.S. PATENT DOCUMENTS

| 5,546,477 | A | * | 8/1996 | Knowles et al. ............. 382/242 |
| 5,835,237 | A | * | 11/1998 | Ebrahimi ..................... 358/448 |
| 5,892,853 | A | | 4/1999 | Hirani et al. |
| 2004/0165786 | A1 | | 8/2004 | Zhang et al. |
| 2004/0218069 | A1 | | 11/2004 | Silverstein |
| 2005/0226503 | A1 | | 10/2005 | Bailey et al. |

2006/0007505 A1  1/2006  Chelvayohan

FOREIGN PATENT DOCUMENTS

EP    0929181    7/1999

OTHER PUBLICATIONS

International Search Report—PCT/US07/078956—International Search Authority—European Patent Office, Jan. 10, 2008.
Written Opinion—PCT/US07/078956—International Search Authority—European Patent Office, Jan. 10, 2008.
Zhang, et al., "Whiteboard It! Convert Whiteboard Content into an Electronic Document", Microsoft Research, Aug. 12, 2002, pp. 1-16.

* cited by examiner

*Primary Examiner*—Anh Hong Do
(74) *Attorney, Agent, or Firm*—Timothy F. Loomis; Espartaco Diaz Hidalgo

(57) ABSTRACT

Methods and apparatus for removing a background image from a captured image are provided. The background is removed by computing a set of representative values (e.g., median values) based on component values of pixels within a portion of interest of the captured image. The captured image is divided into a plurality of sub-blocks. For each sub-block, it is determined whether a predetermined minimum number of similar pixels are found, a similar pixel having component values within a predetermined threshold of the representative values. If the minimum number of similar pixels is found, it is assumed that the sub-block does not comprise part of the background and is retained. If the minimum number of similar pixels is not found, it is assumed that the sub-block comprises part of the background and component values of pixels of the sub-block are set to predetermined values.

34 Claims, 18 Drawing Sheets

US 7,724,947 B2

REMOVAL OF BACKGROUND IMAGE FROM WHITEBOARD, BLACKBOARD, OR DOCUMENT IMAGES

BACKGROUND

1. Field

The present embodiments relate generally to processing images of whiteboards, blackboards, or documents to remove background images.

2. Background

Whiteboards, blackboards, or documents are widely used in discussions and meetings to illustrate ideas and information. An image of a whiteboard, blackboard, or document having content information (comprising, for example, text or lines) may be captured by an image-capturing device (e.g., camera or phone camera). Often the captured image also contains background information (e.g., a person standing next to the whiteboard, a hand holding the document, etc.). As the content contains the substance of the captured image (e.g., text, lines, sketches, etc.), the background image is unnecessary and can be removed to reduce the visual clutter of the captured image and reduce the storage size of the captured image.

As such, there is a need for a method for processing an image of a whiteboard, blackboard, or document to remove the unnecessary background information from the image while also being robust and efficient for implementation on an embedded device or mobile platform (such as a camera or phone camera).

SUMMARY

Some aspects provide methods and apparatus for processing a captured image. The captured image comprises an image of a medium (e.g., whiteboard, blackboard, or document) having content (e.g., text or lines) on the medium and an image of a background. The captured image is processed by removing the background in the captured image.

In some aspects, the background is removed from a captured image by first computing a set of one or more numerical values (referred to herein as the "set of representative values") based on the values of one or more color components of pixels contained within a predetermined portion (referred to herein as the "portion of interest") in the captured image. For example, if it may be assumed that the medium image is near the center of the captured image and the (Y,Cb,Cr) color space is used, the set of representative values may comprise median values for the Y, Cb, and Cr color components of the pixels within a center portion (portion of interest) of the captured image that is ⅗ the width and ½ the height of the captured image. As such, the set of representative values represent the portion of interest (that is assumed to contain or overlap the medium image).

The captured image is then divided into a plurality of sub-blocks. Each sub-block is then processed to determine whether a predetermined minimum number of similar pixels are found in the sub-block, a similar pixel having one or more component values that are within a predetermined threshold of one or more corresponding representative values in the set of representative values. If the predetermined minimum number of similar pixels is found in the sub-block, it may be assumed that the sub-block comprises part of the medium image (i.e., does not comprise part of the background image). As such, processing of the sub-block ends and the next sub-block is examined in a similar manner. However, if the predetermined minimum number of similar pixels is not found in the sub-block, it may be assumed that the sub-block comprises part of the background image and can be removed/altered. As such, the color component values of the pixels of the sub-block are set to predetermined values, e.g., to produce the color white, black, etc.

By processing the captured image in this manner, each sub-block of the captured image considered to be part of the background image is "removed" by changing/altering the pixels of the sub-block to a predetermined color (white, black, etc.). By removing the background image, the processed image may have reduced visual clutter, a smaller file size after compression (e.g., JPEG compression), be more printer friendly, and be optimized for optical character recognition (OCR) processing. The embodiments described herein provides such advantages while also being robust and time and memory efficient for implementation on an embedded device or mobile platform (such as a camera or phone camera).

In some aspects, the methods comprise post-processing methods that operate on the image after it is captured and stored to a memory. In some aspects, the methods and apparatus may be implemented on an image-capturing device that captures the image. In other aspects, the methods and apparatus may be implemented on another device that receives the image from the image-capturing device.

BRIEF DESCRIPTION OF THE DRAWINGS

The present disclosure is further described in the detailed description which follows, by reference to the noted drawings by way of non-limiting example embodiments, in which like reference numerals represents similar parts throughout the several views of the drawings, and wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In the discussion below, Section I provides general terms and a general environment in which an image processing system operates. Section II describes an image processing method for removing the background image from a captured image. Section III provides examples of the image processing method described in Section II.

I. General Terms and Image Processing Environment

Figure 1:
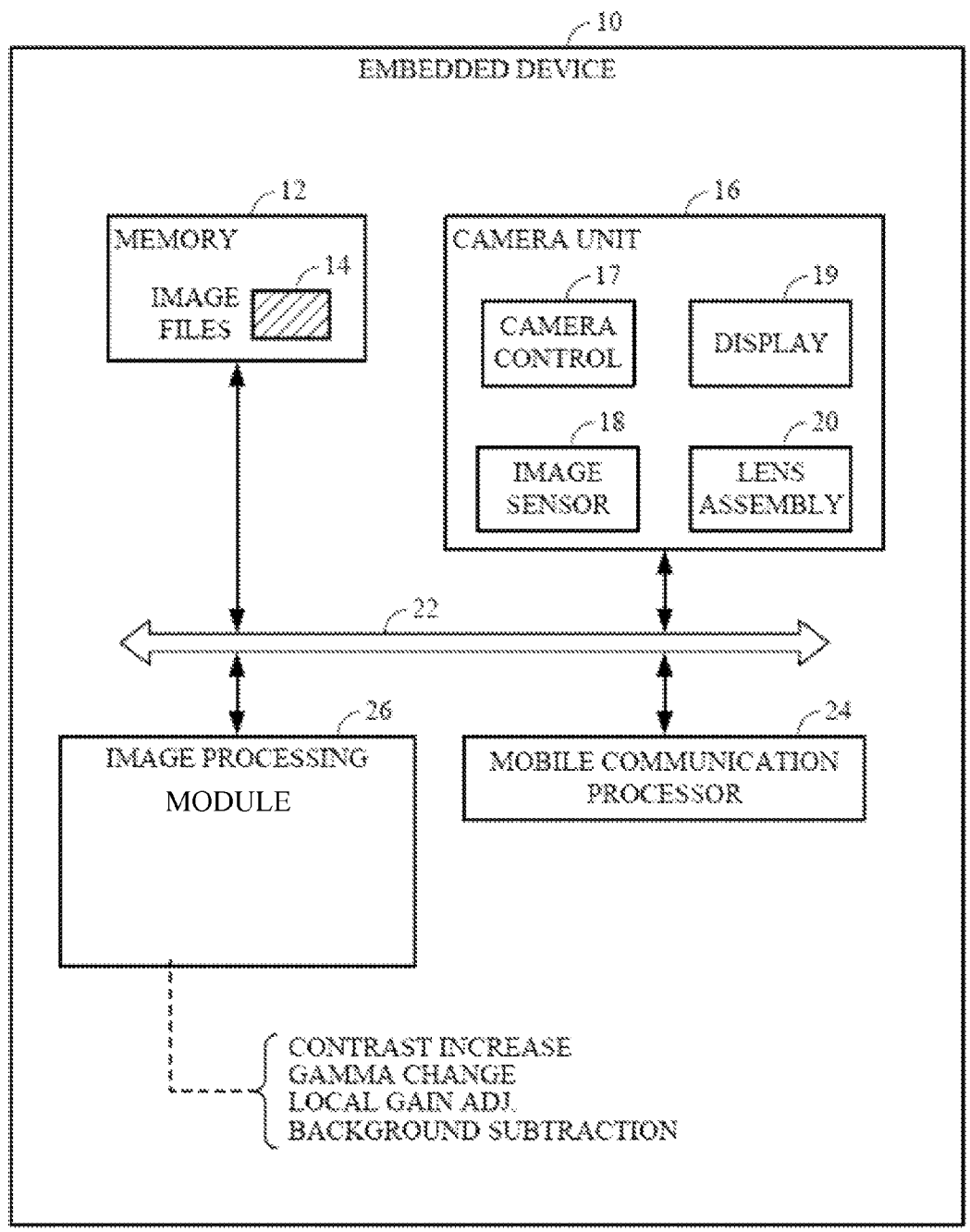
FIG. 1 is a block diagram of an embedded device in which some embodiments are implemented.

FIG. 1 is a block diagram of an embedded device 10 in which some embodiments are implemented. The embedded device 10 comprises, for example, a camera, a mobile phone (with voice transmission capabilities) with a camera, or another type of device (as discussed below in relation to FIG. 3). In this exemplary embodiment, the embedded device 10 comprises a mobile phone with a camera. The device 10 comprises a memory 12 that stores image files 14, a camera unit/image capturing device 16, an image processing module 26, and a mobile communication processor 24. These components are coupled to each other via a data bus 22.

The camera unit/image capturing device 16 comprises a camera control 17, an image sensor 18, a display 19, and a lens assembly 20. As is well known in the art, the components of the camera unit 16 are used to capture an image. An image captured by the camera unit 16 may be stored to the memory 12 as an image file 14. The image processing module 26 may be configured to receive a captured image (as an image file) and processes the image using methods described herein. The mobile communication processor 24 may be used to receive the processed image from the image processing module 26 and transmit the processed image to a recipient, to a remote server, or to a remote website via a wireless connection.

Figure 2:
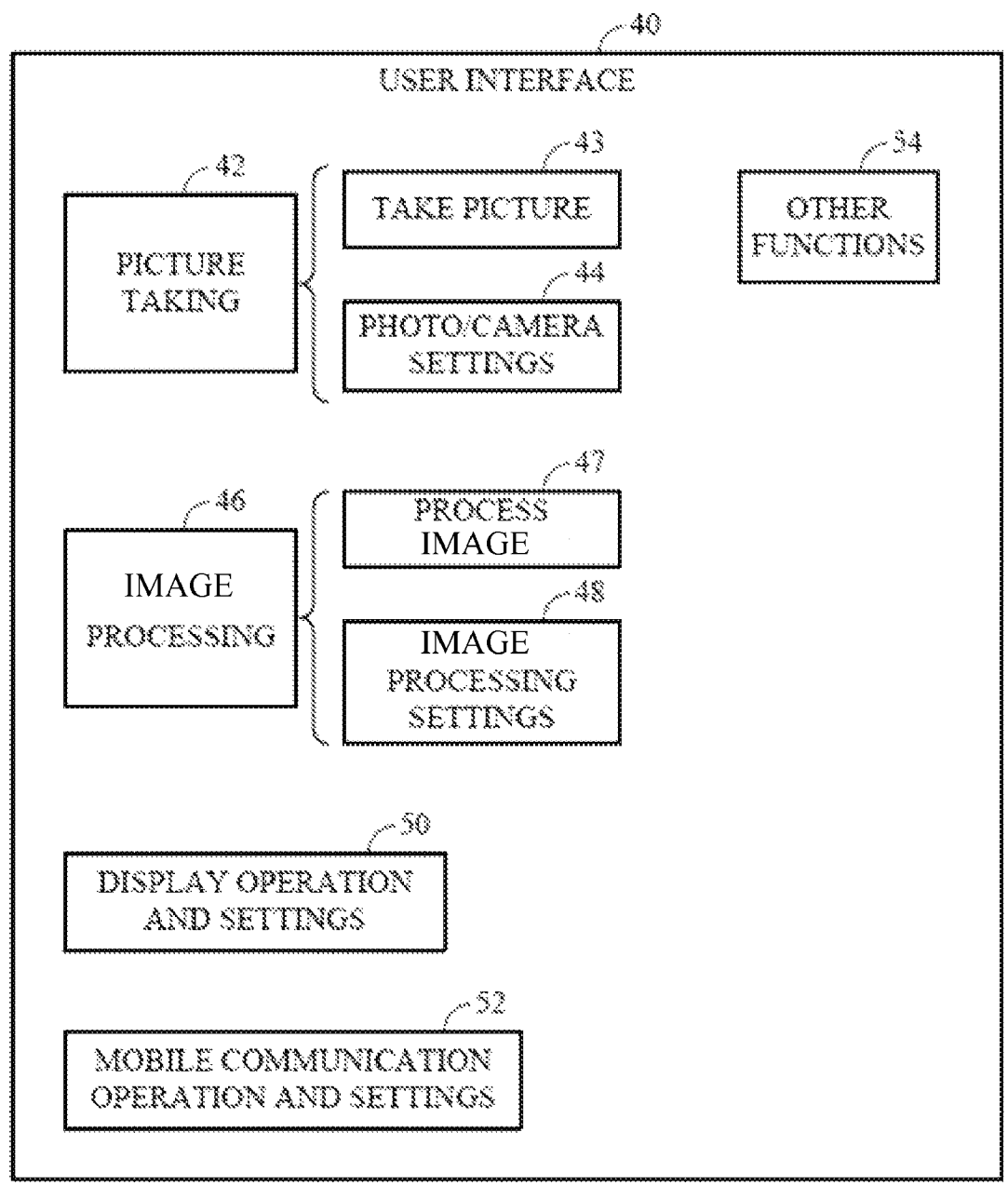
FIG. 2 is a conceptual diagram of a user interface of the embedded device shown in FIG. 1.

FIG. 2 is a conceptual diagram of a user interface 40 of the embedded device 10 shown in FIG. 1. The user interface 40 includes a picture taking interface 42, an image processing interface 46, and a display operation and settings interface 50. In addition, the user interface 40 may include a mobile communication operation and settings interface 52 and other functions interface 54. The picture taking interface 42 allows a user to take a picture 43 and adjust photograph and camera settings 44. The image processing interface 46 allow the user to process a captured image 47 and to define image processing settings 48.

Each of the interfaces may include, for example, a display or notification mechanism for communicating information to the user. For example, sound, light, or displayed text or image information may be used to present the user with certain information concerning the interface function and the status of the embedded device pertaining to that function. In addition, each of the interfaces may include an input or an activation mechanism for activating a particular function of the device (such as image processing) or for inputting information into the device, for example, to change settings of one or more functions of the device.

Figure 3:
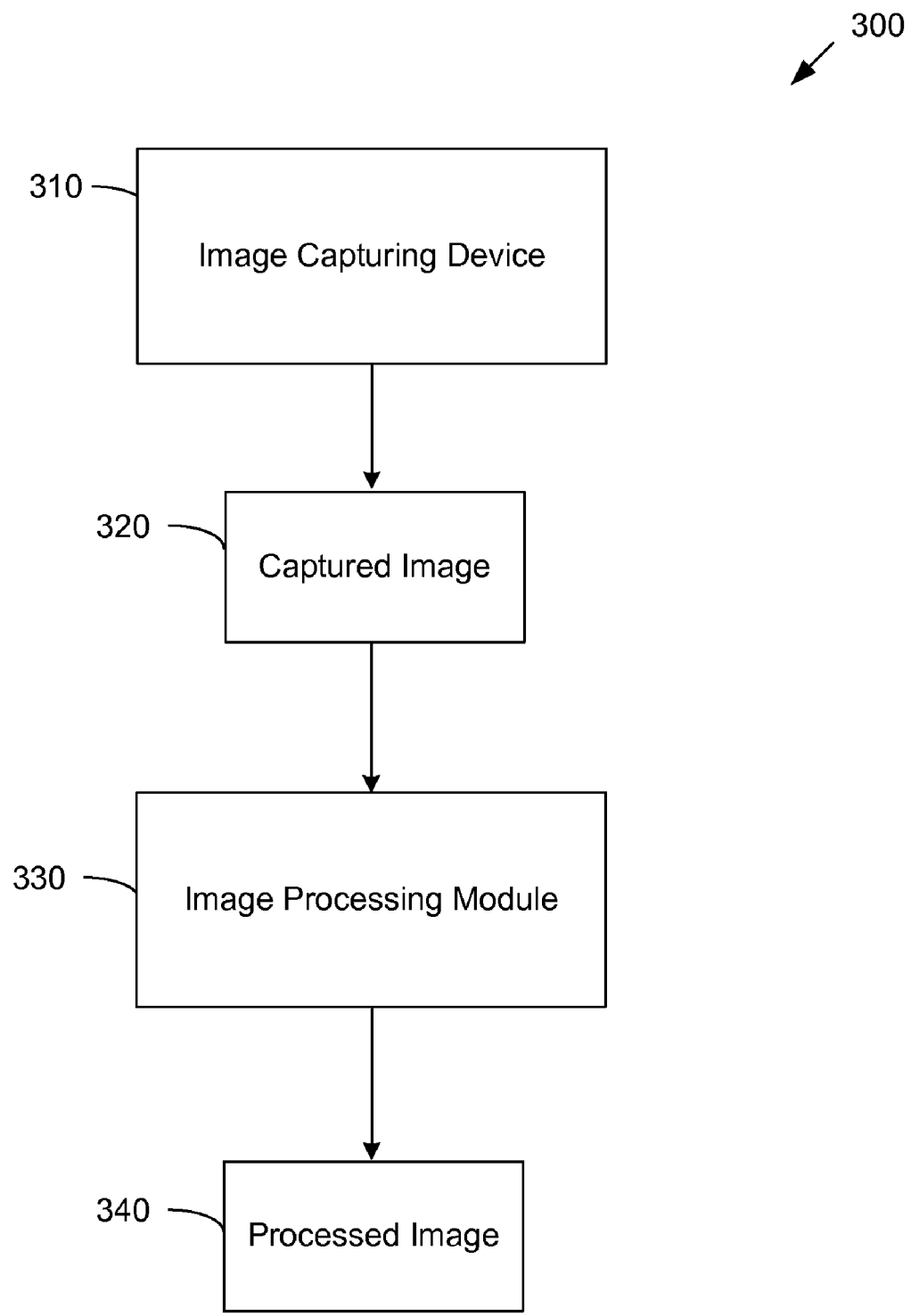
FIG. 3 shows an environment in which some embodiments operate.

FIG. 3 shows an environment 300 in which some embodiments operate. The environment 300 comprises an image capturing device 310, a captured image 320, an image processing module 330, and a processed image 340.

The image capturing device 310 comprises any device capable of capturing a digital image. In some embodiments, the image capturing device 310 comprises a camera, mobile communications device with a camera, a personal data assistant (PDA) with a camera, or any other device with a camera. In other embodiments, the image capturing device 310 comprises a document facsimile reading apparatus, a photocopy machine, a business card reader, a bar code scanner, a document scanner, or the like.

The image capturing device 310 produces the captured image 320. In some embodiments, the captured image 320 comprises an image of a whiteboard, blackboard, any other board of a different color, or any other type of structure. In other embodiments, the captured image 320 comprises an image of a document of any color (e.g., black, white, etc.). Examples of a document are a sheet of paper, a business card, or any other type of printable or readable medium. In further embodiments, the captured image 320 comprises an image of any type of medium having content written, drawn, printed, or otherwise displayed on it. In additional embodiments, the captured image 320 comprises an image of something else. The captured image 320 is stored on a memory that may be internal or external to the image capturing device 310.

Figure 4:
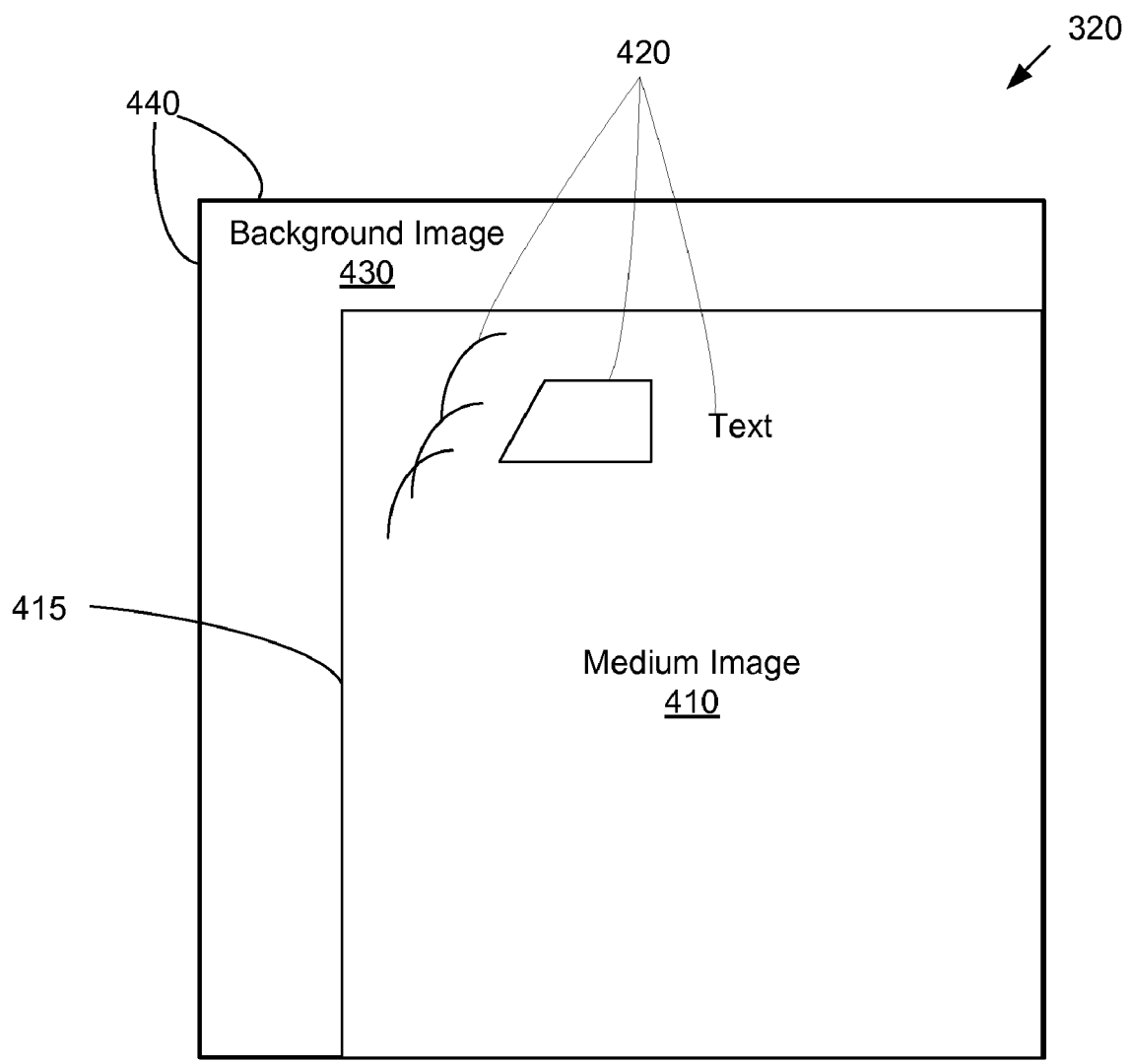
FIG. 4 shows an example of a typical captured image.

An example of a typical captured image 320 is shown in FIG. 4. As shown in FIG. 4, a typical image 320 comprises an image of a medium 410 (e.g., whiteboard, blackboard, document, etc.) having content 420 (e.g., text, lines, drawings, sketches, etc.) on the medium and an image of a background 430. Note that the content 420 is located within inside the boundaries 415 of the medium 410. The content image generally comprises anything written, drawn, printed, or otherwise displayed on the medium and comprises the substance of the captured image (e.g., text, lines, sketches, etc.).

In contrast, the background image 430 comprises the portion of the captured image 320 that is not part of the medium image 410 (i.e., the remainder of the captured image). The background image 430 is typically located outside of the boundaries 415 of the medium 410 and extends to the border 440 of the captured image 320 but may also be inside the boundaries 415 (e.g., a person standing in front of the medium). The background image 430 comprises the unnecessary portion of the captured image 320. A background image 430 may include, for example, an image of a wall next to the whiteboard or blackboard, an image of a person standing next to a whiteboard or blackboard, an image of a hand holding a document, etc.

An image generally comprises a pattern/array of pixels where each pixel is defined by and is associated with a set of one or more color components. The level/intensity of each color component of a pixel is represented, for example, in terms of a numerical value. Various color spaces may have different color components and/or a different number of color components that define the color space. A few examples of color spaces well known in the art are YUV (YPbPr, YCbCr, etc.), RGB, CMYK, HSB and CIE. The image processing described herein may be performed on an image in any color space having any color component and any number of color components. Since images are often stored in digitally compressed format, and for the purposes of discussion and clarity, some embodiments are described below using the (Y,Cb,Cr) color space. In other embodiments, the image processing steps may be applied to an image having any other format or any other type of color space.

Referring back to FIG. 3, the image processing module 330 receives the captured image 320 from the image capturing device 310 and produces a processed image 340. The image processing module 330 processes the captured image 320 using methods described herein to remove the background in the captured image 320. In some embodiments, the image capturing device 310 and the image processing module 330 are implemented on a same device. In other embodiments, the image capturing device 310 and the image processing module 330 are implemented on separate devices.

II. Removing the Background Image While Retaining the Content Image

As discussed above, a typical captured image comprises an image of a medium (e.g., whiteboard, blackboard, document, etc.) having content on the medium and an image of a background. The medium image (with the content) comprises the substance of the captured image, whereas the background image comprises the unnecessary portion of the captured image. In some embodiments, the background image is removed/altered to produce a processed image that will have a smaller file size after compression, will be more printer friendly, have reduced visual clutter, and be optimized for optical character recognition (OCR) processing while also being robust and time and memory efficient for implementation on an embedded device or mobile platform.

Figure 5:
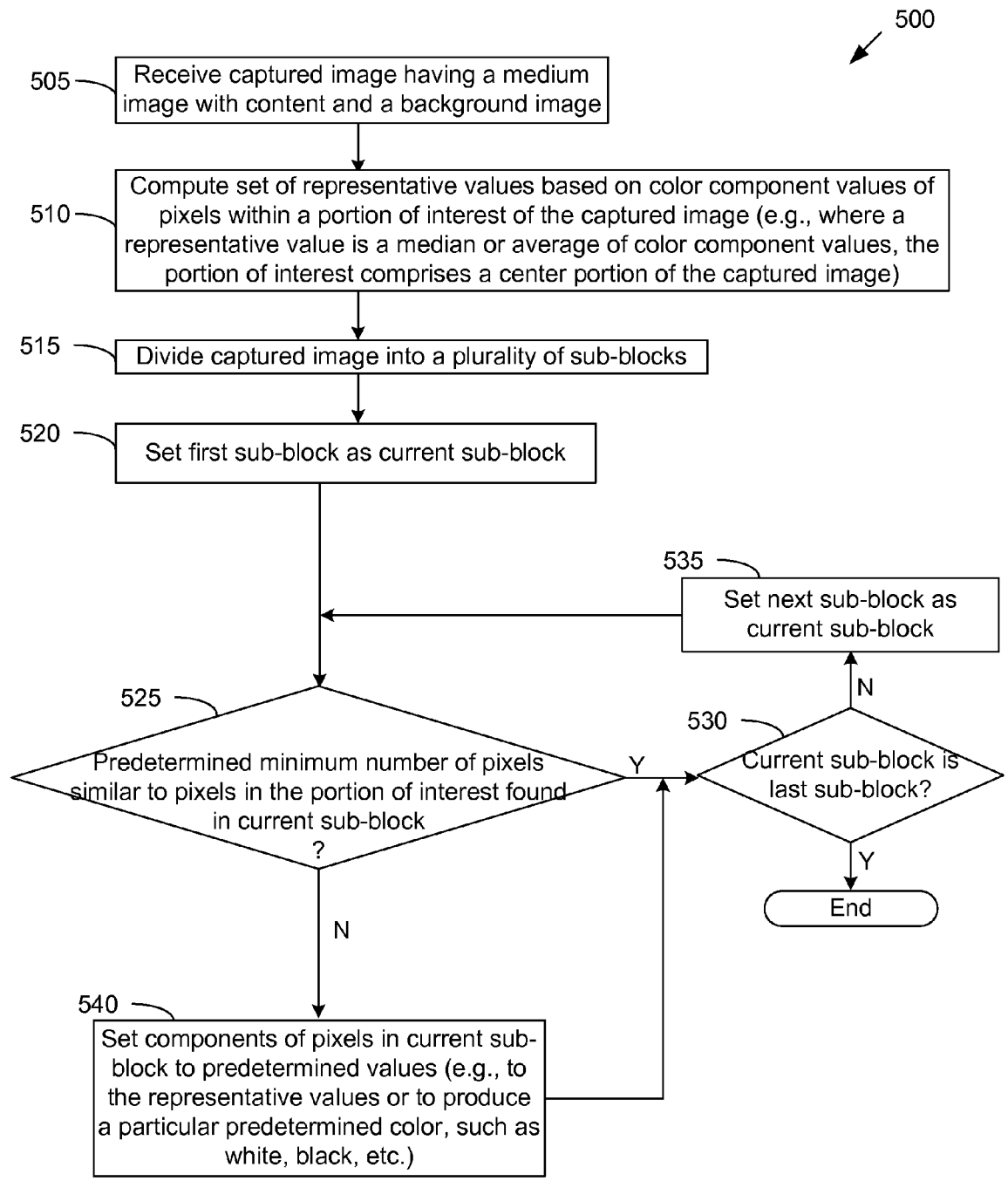
FIG. 5 shows a flowchart of a method for removing the background image of a captured image.

FIG. 5 shows a flowchart of a method 500 for removing the background image of a captured image. The method 500 may be implemented through software and/or hardware configured to implement the method. The method may be implemented on an image-capturing device or on a separate device that receives a captured image for processing. In other embodiments of the method 500, a different number of steps and/or a different order of steps is used.

Figure 6:
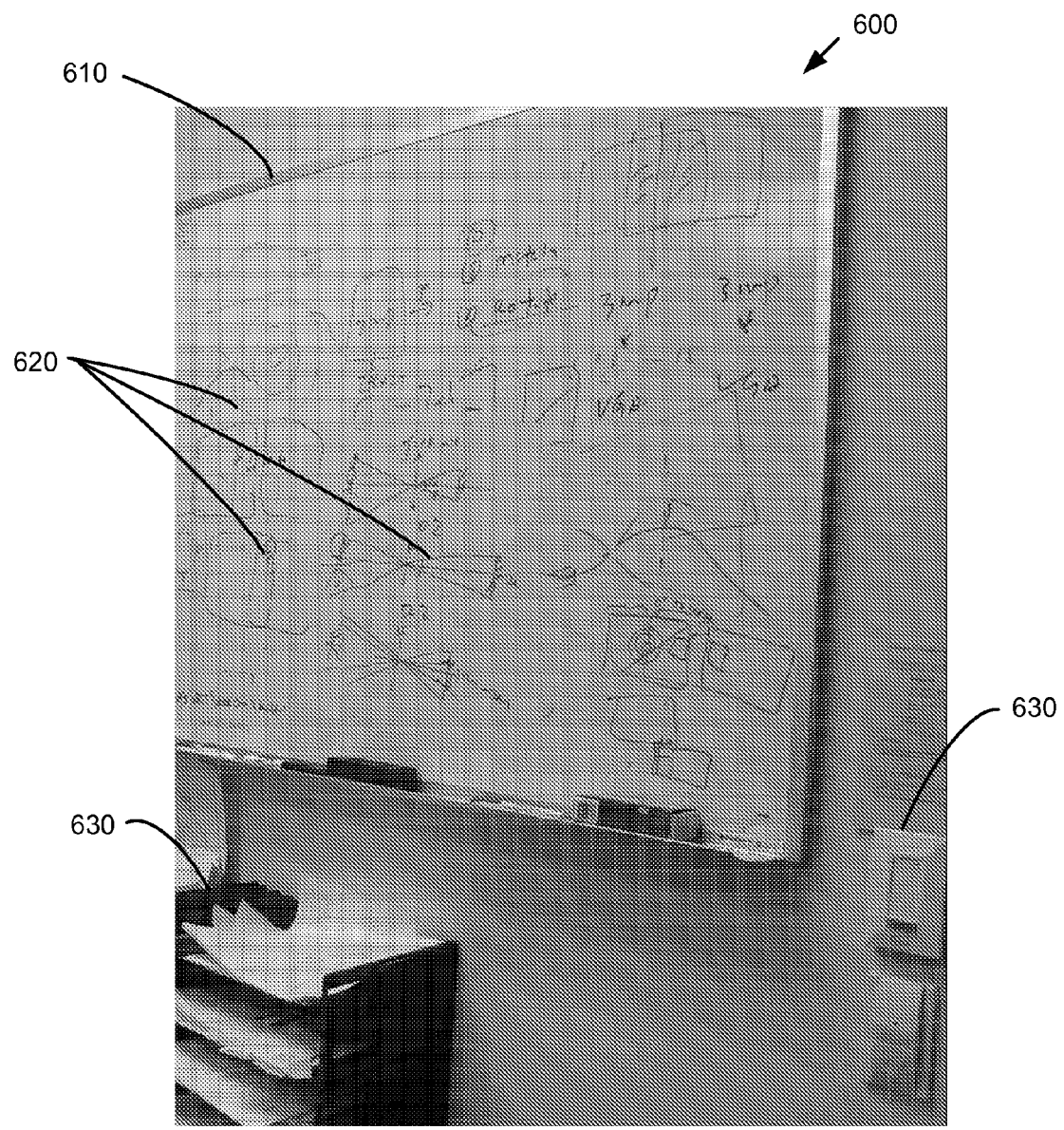
FIG. 6 shows an example of a captured image of a whiteboard medium having content and a background.
Figure 7:
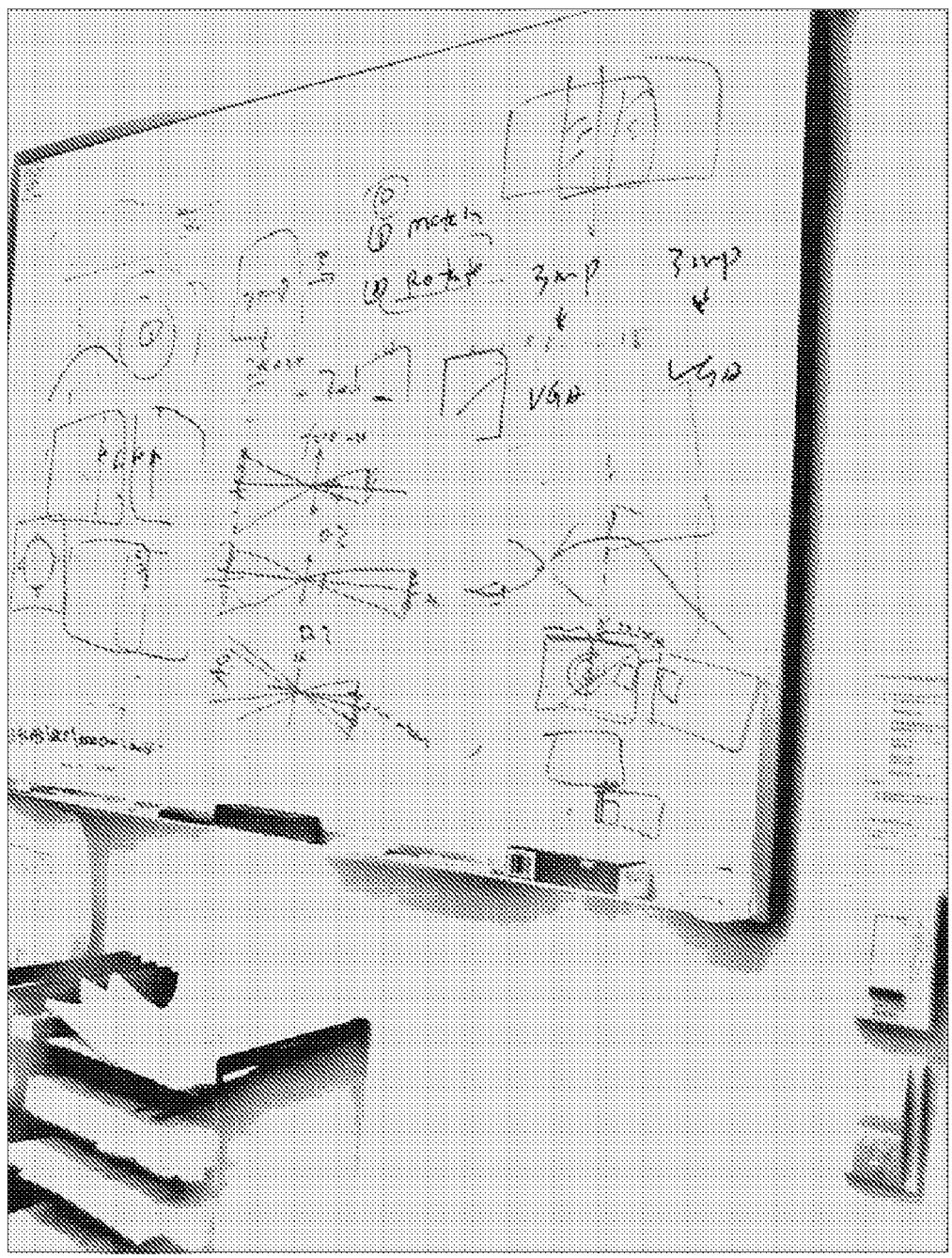
FIG. 7 shows an example of an enhanced captured image of the image of FIG. 6.

The method 500 begins when a captured image is received (at 505), the captured image comprising an image of a medium having content and an image of a background. An example of a captured image 600 of a whiteboard medium 610 having content 620 and a background 630 is shown in FIG. 6. In some embodiments, the captured image is an enhanced captured image produced by any image enhancement method known in the art. Image enhancement methods are typically used to improve the visibility of the content of the captured image to have clearer image quality, better contrast, etc. FIG. 7 shows an example of an enhanced captured image of the image of FIG. 6.

The method 500 then computes (at 510) a set of one or more numerical values (representative values) based on the values of one or more color components of pixels contained within a predetermined portion (portion of interest) of the captured image to represent the portion of interest. For example, the set of representative values may comprise a median or average value for each color component of the pixels within the portion of interest. For example, in the (Y,Cb,Cr) color space, the set of representative values may comprise a median value for each color component of the pixels within the portion of interest, whereby the set of representative values comprises a median value for the Y component (median Y), a median value for the Cb component (median Cb), and a median value for the Cr component (median Cr). In the (R,G,B) color space, the set of representative values may comprise a median value for each color component of the pixels within the portion of interest, whereby the set of representative values comprises median R, median G, and median B. In other embodiments, a representative value comprises any other value derived from values of a color component, such as an average value, minimum value, maximum value, etc.

In some embodiments, the portion of interest of the captured image has a predefined position or center point relative to the captured image and predefined width and height dimensions relative to the captured image. Typically, the medium image in the captured image will be located around the center of the captured image. As such, in some embodiments, the portion of interest comprises a center portion of the captured image having the same center point as the captured image. For example, the portion of interest may comprise a portion centered at the center point of the captured image having ⅗ the width and ½ the height of the captured image.

In other embodiments, the portion of interest comprises a portion of the captured image having a different position or center point relative to the captured image and/or different width and/or height dimensions relative to the captured image. In some embodiments, a user may specify the position and/or the dimensions of the portion of interest relative to the captured image (e.g., through the image processing interface 46 shown in FIG. 2). For example, if the medium image of the captured image is found in the upper-left area of the captured image, the user may specify the position and dimensions of the portion of interest so as to substantially overlap the medium image in the upper-left area.

Figure 8:
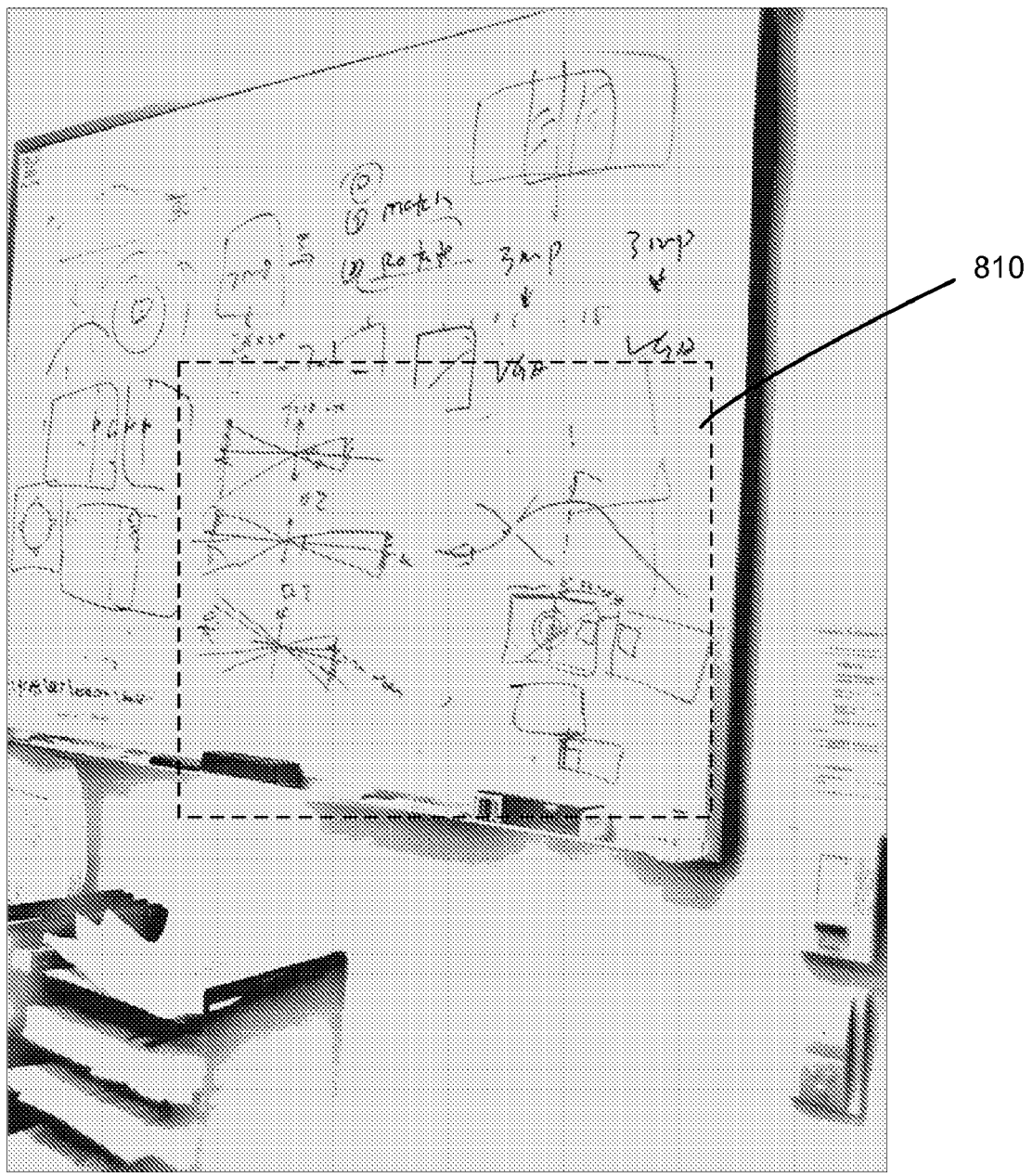
FIG. 8 shows an example of a portion of interest of the captured image of FIG. 6.

FIG. 8 shows an example of a portion of interest 810 of the captured image of FIG. 6. In the example of FIG. 8, the portion of interest 810 of the captured image comprises a center portion of the captured image having the same center point as the captured image. Assuming the (Y,Cb,Cr) color space is used, in the example of FIG. 8, the method would compute (at 510) a median value for each of the Y, Cb, and Cr color components of the pixels within the portion of interest 810.

Figure 9:
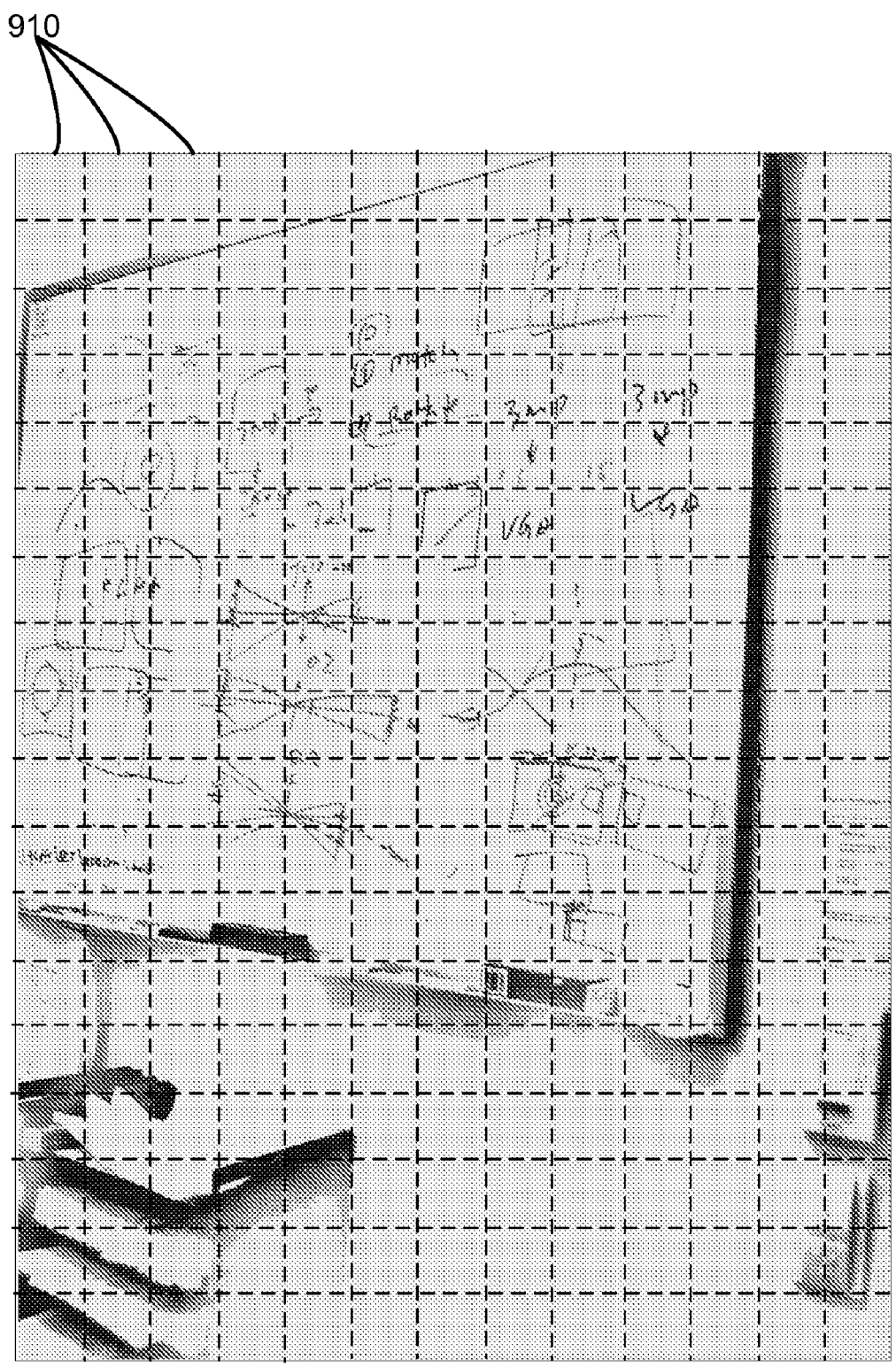
FIG. 9 shows an example of the captured image of FIG. 6 divided into a plurality of sub-blocks.

The method then divides (at 515) the captured image into a plurality of N×M sub-blocks. In some embodiments, a user may specify the size of the sub-blocks (e.g., through the image processing interface 46 shown in FIG. 2). In some embodiments, the sub-blocks have a default size of 8×8 pixels. Note that a smaller sub-block size may provide a more precise removal of the background image. FIG. 9 shows an example of the captured image of FIG. 6 being divided into a plurality of sub-blocks 910.

The method then sets (at 520) a first sub-block of the captured image as a current sub-block. For the current sub-block, the method then determines (at 525) whether a predetermined minimum number of similar pixels (similar to the pixels in the portion of interest) are found in the sub-block, a similar pixel having one or more component values within a predetermined threshold of one or more corresponding representative values.

In some embodiments, for a component value of a pixel to be within the predetermined threshold, the absolute difference between the component value and the corresponding representative value must be equal to or below the predetermined threshold. For example, if the predetermined threshold for the Y component is 25 and the representative value for the Y component is 100, then the Y component value of a pixel may be within the range of 75 and 125, inclusive, to be within the predetermined threshold and considered a similar pixel. In some embodiments, the predetermined threshold may be the same or different in value for each color component of a color space. In some embodiments, a user may specify the predetermined threshold for each color component (e.g., through the image processing interface 46 shown in FIG. 2).

In some embodiments, to determine whether a pixel is a similar pixel, the method determines (at 525) whether all component values of the pixel are within each predetermined threshold of their corresponding representative values. For example, if the (Y,Cb,Cr) color space is used, for a pixel to be considered a similar pixel in some embodiments, the Y component value may be within a first predetermined threshold of the representative Y value, the Cb component value may be within a second predetermined threshold of the representative Cb value, and the Cr component value may be within a third predetermined threshold of the representative Cr value. Note that the first, second, and third predetermined thresholds may be equal or different in value.

In other embodiments, the method determines (at 525) whether some component values (rather than all component values) of a pixel are within the predetermined threshold of their corresponding representative values to determine whether the pixel is a similar pixel. For example, if the (Y,Cb,Cr) color space is used, for a pixel to be considered a similar pixel in some embodiments, only one of three or two of three component values may be within the predetermined threshold of their corresponding representative values. In some embodiments, a user may specify the number of components of a pixel that must match with its corresponding representative value to be considered a similar pixel (e.g., through the image processing interface 46 shown in FIG. 2).

In some embodiments, the predetermined minimum number of similar pixels to be found is one. As such, there only needs to be one similar pixel in a sub-block for the conditional of step 525 to be found true. In these embodiments, upon finding one similar pixel in a sub-block, processing of the sub-block ends. In other embodiments, the predetermined minimum number of similar pixels to be found is two or greater. For example, three similar pixels in a sub-block must be found for the conditional of step 525 to be true. In these embodiments, upon finding three similar pixels in a sub-block, processing of the sub-block ends. In some embodiments, a user may specify (e.g., through the image processing interface 46 shown in FIG. 2) the number of similar pixels in a sub-block that must be found for the sub-block to be considered part of the medium image.

If the conditional step of 525 is found to be true (i.e., the predetermined minimum number of similar pixels in the sub-block are found), it is assumed that the current sub-block comprises part of the medium image and does not comprise part of the background image. As such, the method then stops processing of the current sub-block and proceeds to step 530 where the method determines whether the current sub-block is the last sub-block of the captured image. If so, the method 500 ends. If not, the method sets (at 535) the next sub-block in the captured image as the current sub-block.

If the conditional step of 525 is found not to be true (i.e., the predetermined minimum number of similar pixels in the sub-block are not found), it is assumed that the current sub-block does not comprise part of the medium image and comprises part of the background image. As such, the method then sets (at 540) each color component value of each pixel of the current sub-block to a predetermined value. In some embodiments, the method sets (at 540) each color component value of each pixel to equal the corresponding representative value. For example, if the (Y,Cb,Cr) color space is used, the method may set, for each pixel, the Y component value to equal the representative Y value, the Cb component value to equal the representative Cb value, and the Cr component value to equal the representative Cr value.

In other embodiments, the method sets (at 540) each color component value of each pixel to produce a particular predetermined color (e.g., white, black, etc.). In some embodiments, a user may specify the predetermined color (e.g., through the image processing interface 46 shown in FIG. 2). For example, if the user was taking a picture of a whiteboard, the user may set the predetermined color to white. The method then proceeds to step 530.

Figure 10:
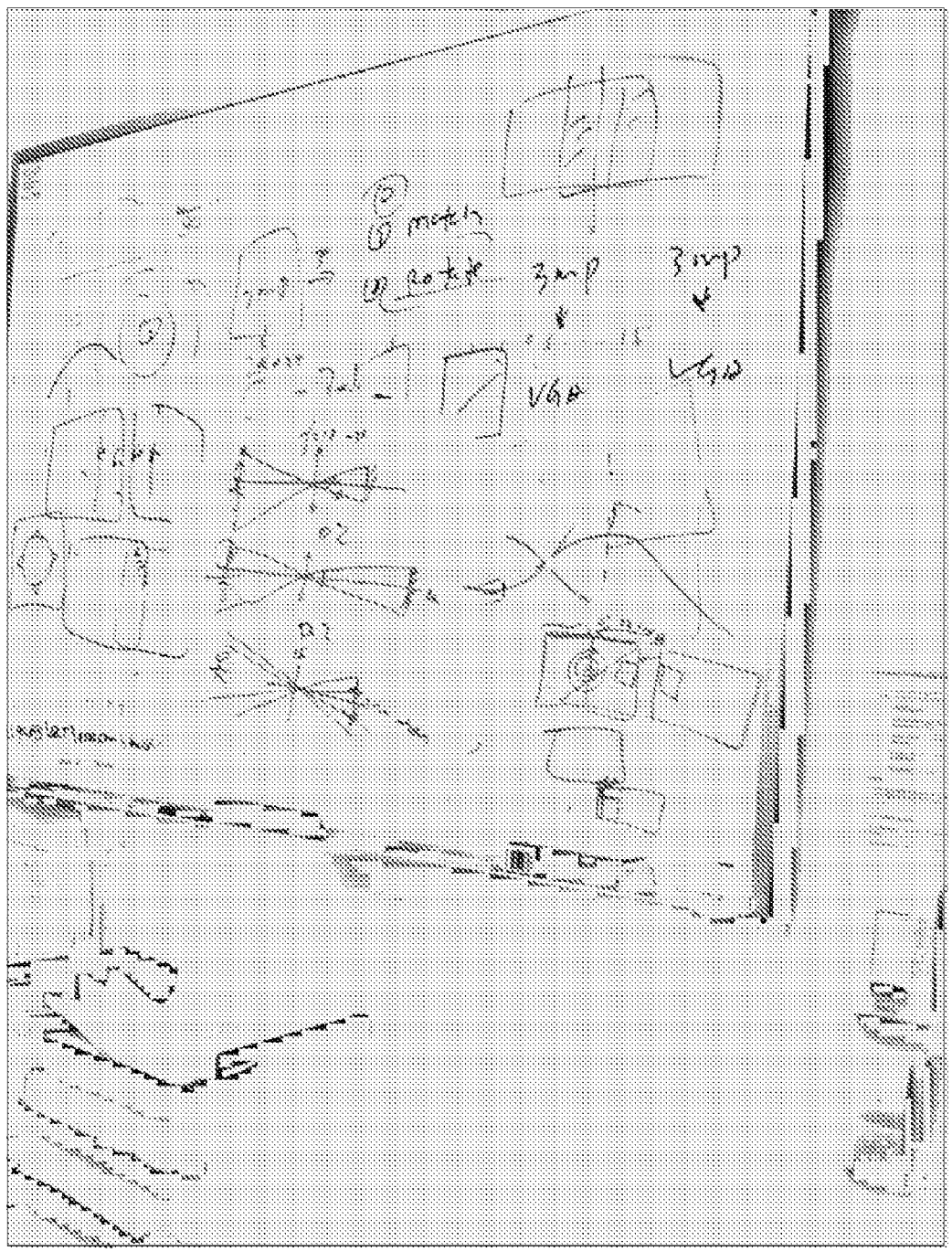
FIG. 10 shows an example of the captured image of FIG. 6 after much of the background image has been removed.

After the last sub-block of the captured image is processed, the method 500 ends. By processing the captured image in this manner, each sub-block considered to be part of the background image is "removed" by modifying the pixels of the sub-block to a predetermined color (white, black, etc.). FIG. 10 shows an example of the captured image of FIG. 6 after much of the background image has been removed.

III. Examples of the Image Processing Steps

The examples of the image processing steps provided below are for illustrative purposes only and do not limit the embodiments described herein. For example, the examples described below show a particular order of image processing steps. However, this order of steps may be changed and/or a step may be removed without departing from the embodiments described herein. Further, the examples below relate to images of a whiteboard and a white document. However, images of a board or document of any other color may be used without departing from the embodiments described herein. Also, sub-blocks determined to be part of the background image have been modified to the color white in the below examples. However, sub-blocks determined to be part of the background image can be modified to any other color.

Figure 11A:
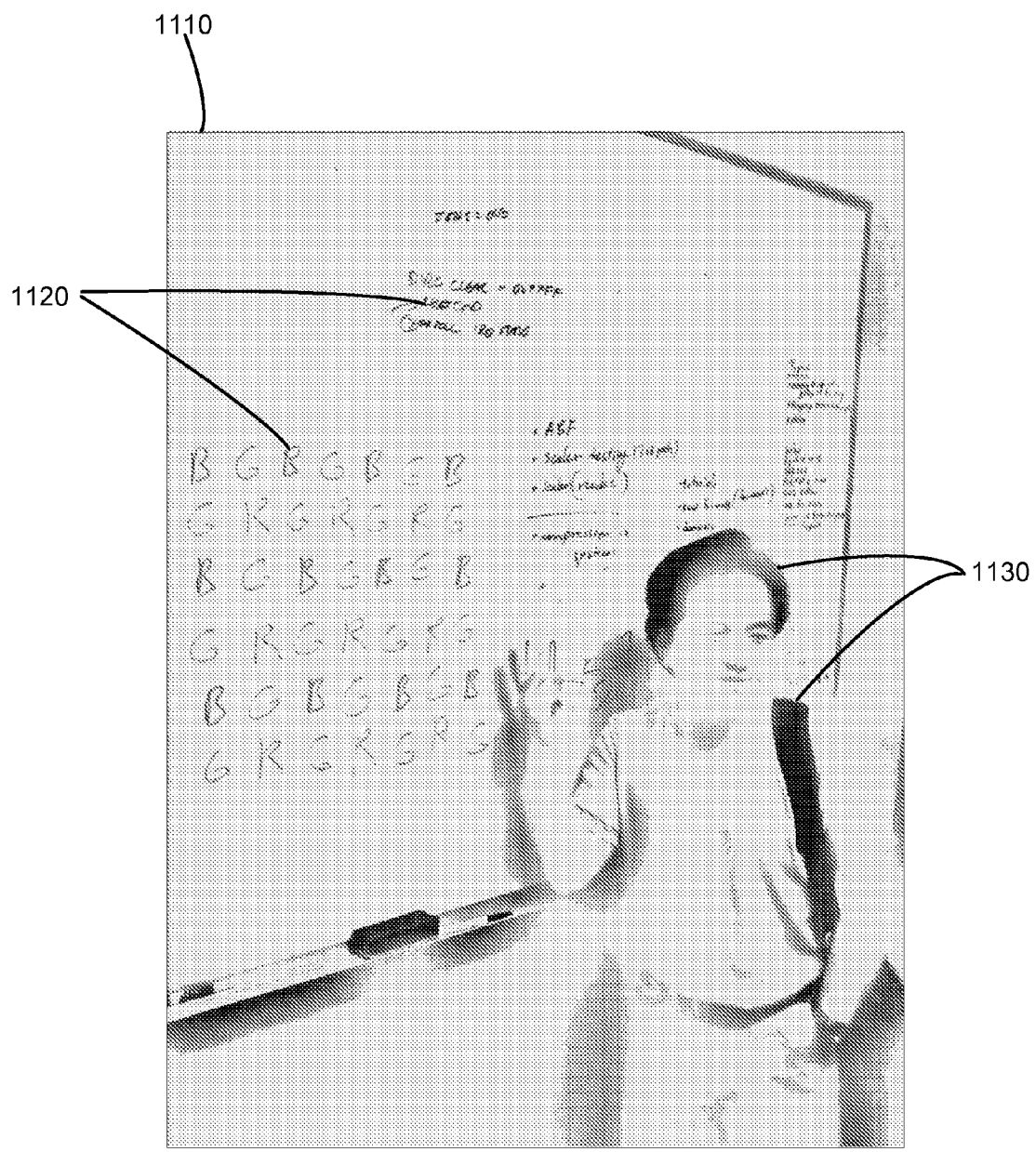
FIG. 11A shows an example of a captured image of a whiteboard having content and a background.

FIG. 11A shows an example of a captured image of a whiteboard 1110 having content 1120 and a background 1130. The captured image of FIG. 11A has been enhanced by an image enhancement method known in the art. In the example of FIG. 11A, the whiteboard and the text written on the whiteboard (content) comprises the substance of the captured image, whereas the person standing in front of the whiteboard is part of the unnecessary background of the captured image.

Figure 11B:
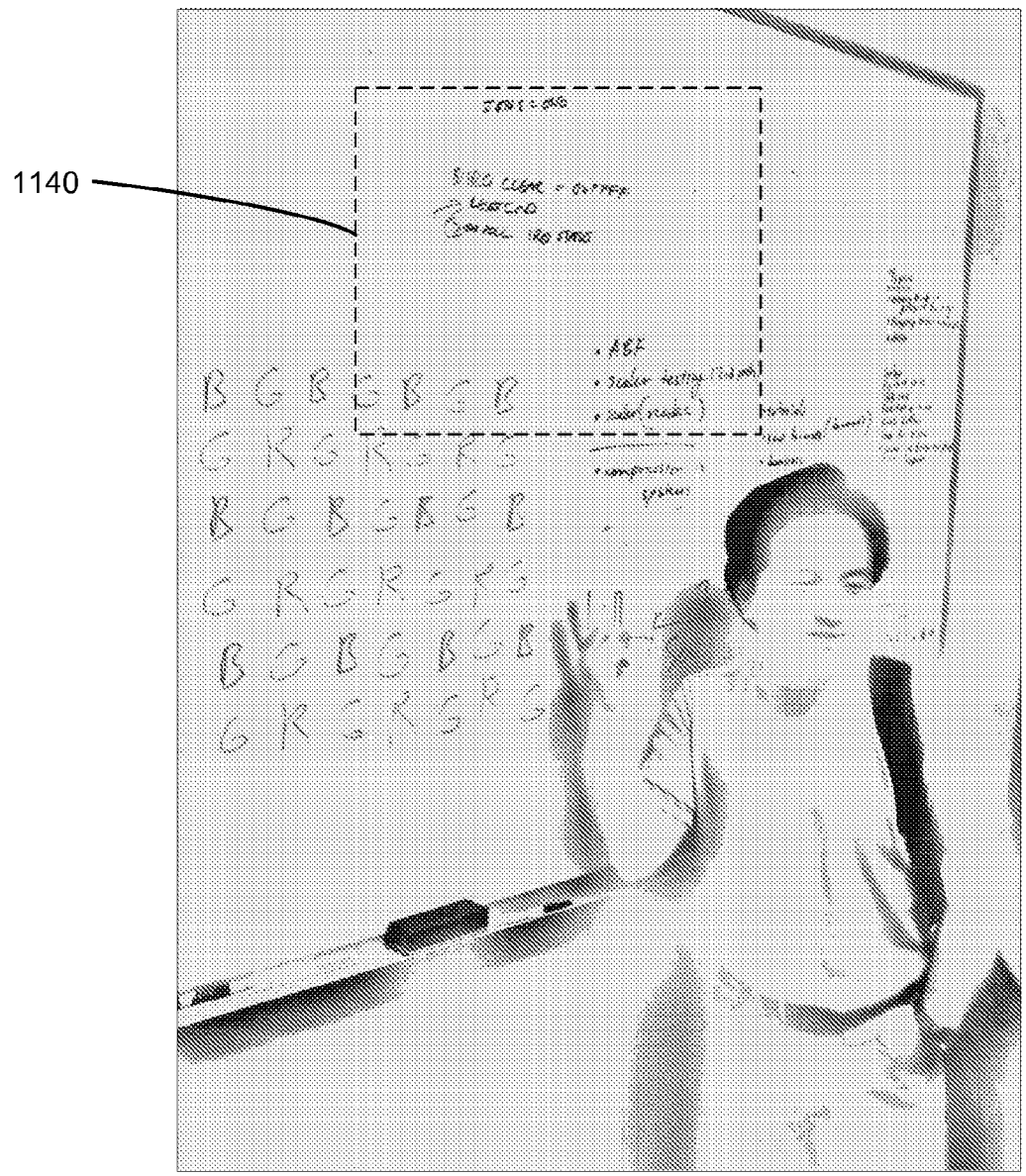
FIG. 11B shows the captured image of FIG. 11A having a portion of interest.

FIG. 11B shows the captured image of FIG. 11A having a portion of interest 1140. Color component values of pixels within the portion of interest 1140 are used to determine a set of representative values to represent the portion of interest (e.g., where a representative value is a median or average of color component values). For example, if the (Y,Cb,Cr) color space is used, the set of representative values may comprise a median value for the Y components, a median value for the Cb components, and a median value for the Cr components of the pixels within the portion of interest 1140. In the example of FIG. 11B, the portion of interest 1140 is not centered within the captured image (does not have the same center point as the captured image). In the example of FIG. 11B, the position of the portion of interest 1140 may have been specified by a user.

Figure 11C:
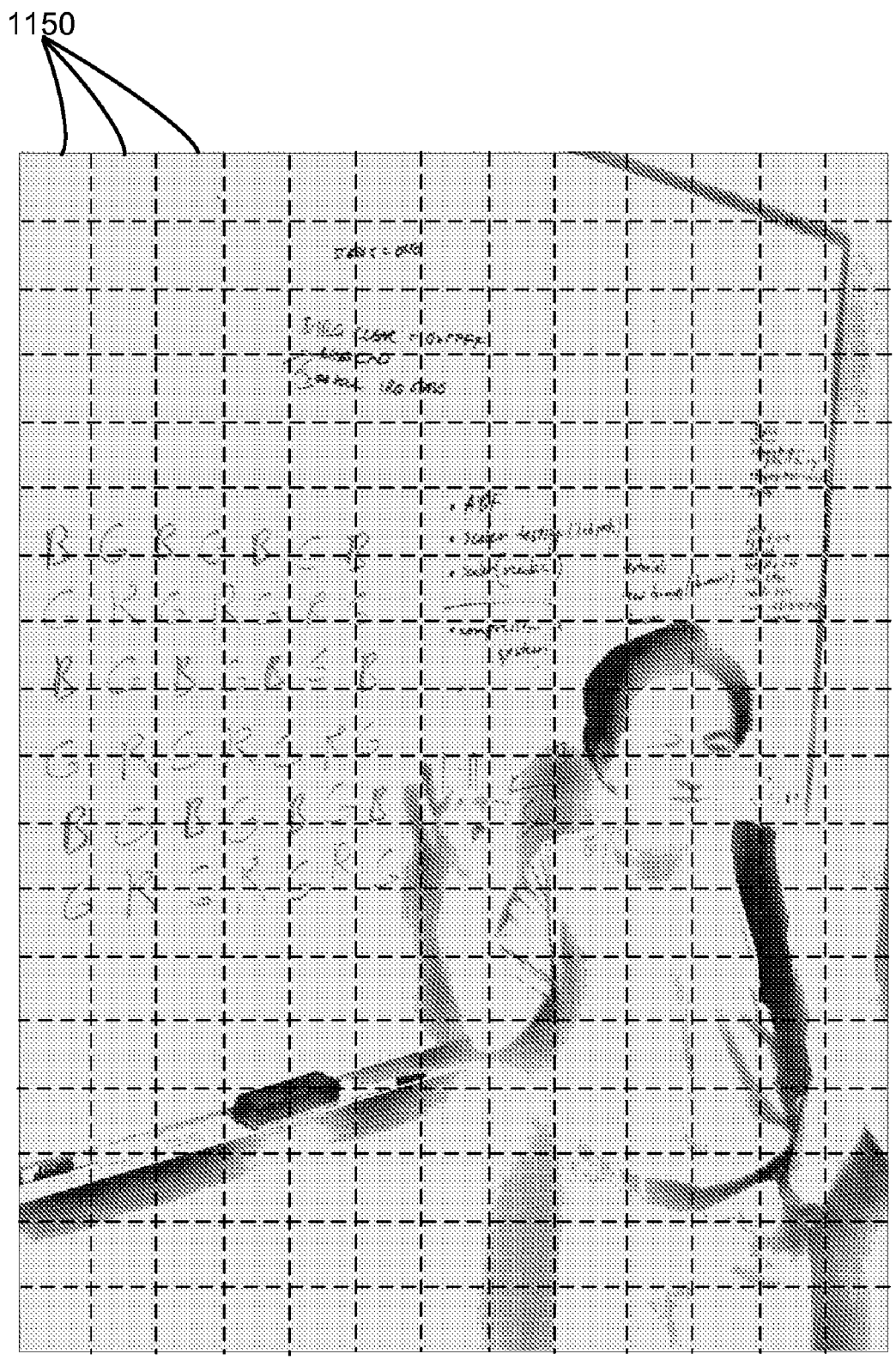
FIG. 11C shows the captured image of FIG. 11A divided into a plurality of sub-blocks.

FIG. 11C shows the captured image of FIG. 11A being divided into a plurality of sub-blocks 1150. The sub-blocks may have a default size of 8×8 pixels or may have another size (e.g., as set by the user). Each sub-block is analyzed to determine whether it contains a predetermined minimum number of similar pixels. If so, the sub-block is determined to be part of the medium image and is no longer processed. If not, the sub-block is determined to be part of the background image and can be removed/altered without affecting the substance of the captured image.

Figure 11D:
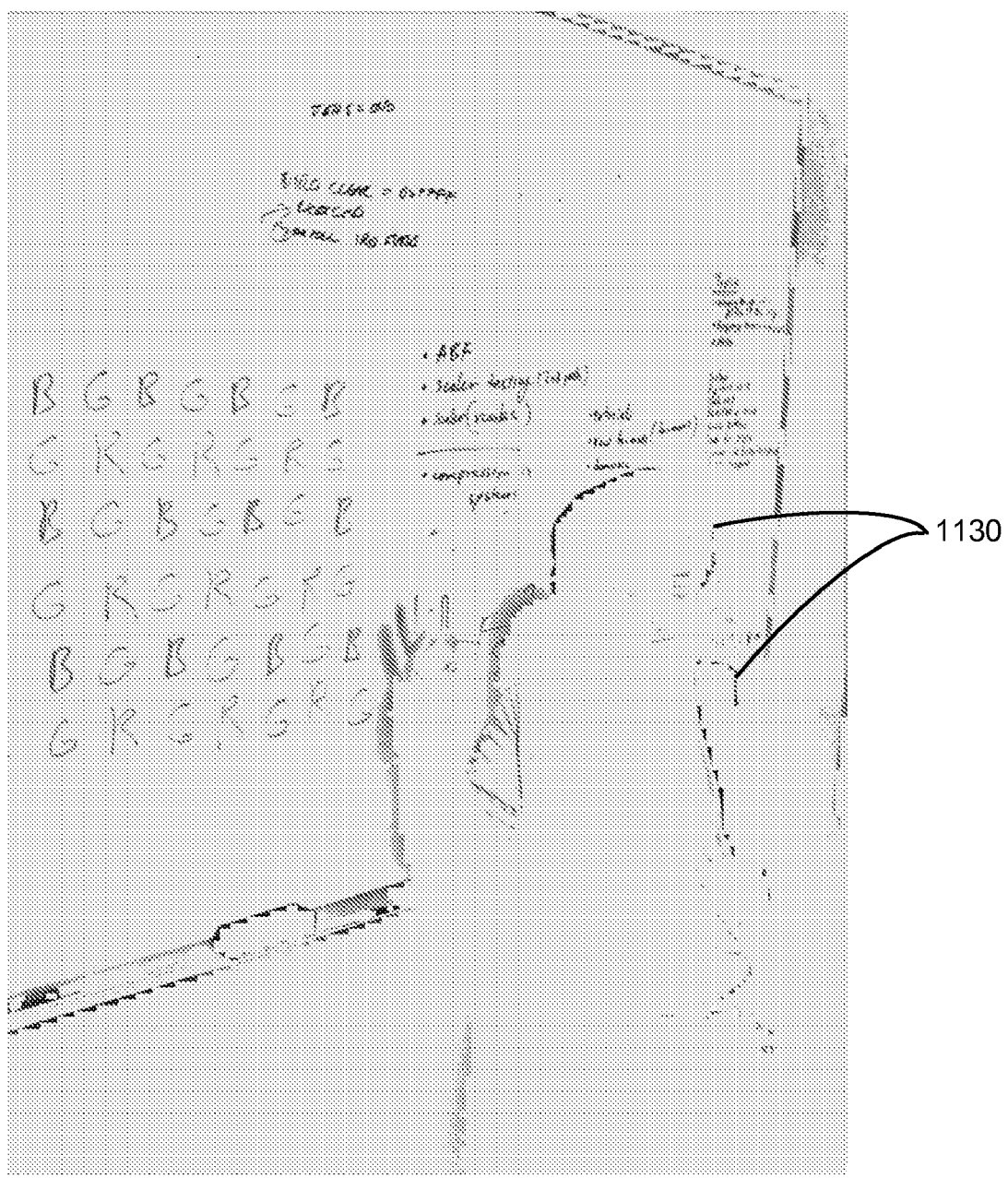
FIG. 11D shows the captured image of FIG. 11A where much of the background image has been removed.

FIG. 11D shows the captured image of FIG. 11A where much of the background image 1130 has been removed/altered. In the example of FIG. 11D, the pixels of sub-blocks determined to be part of the background image have been modified to produce the color white.

Figure 12A:
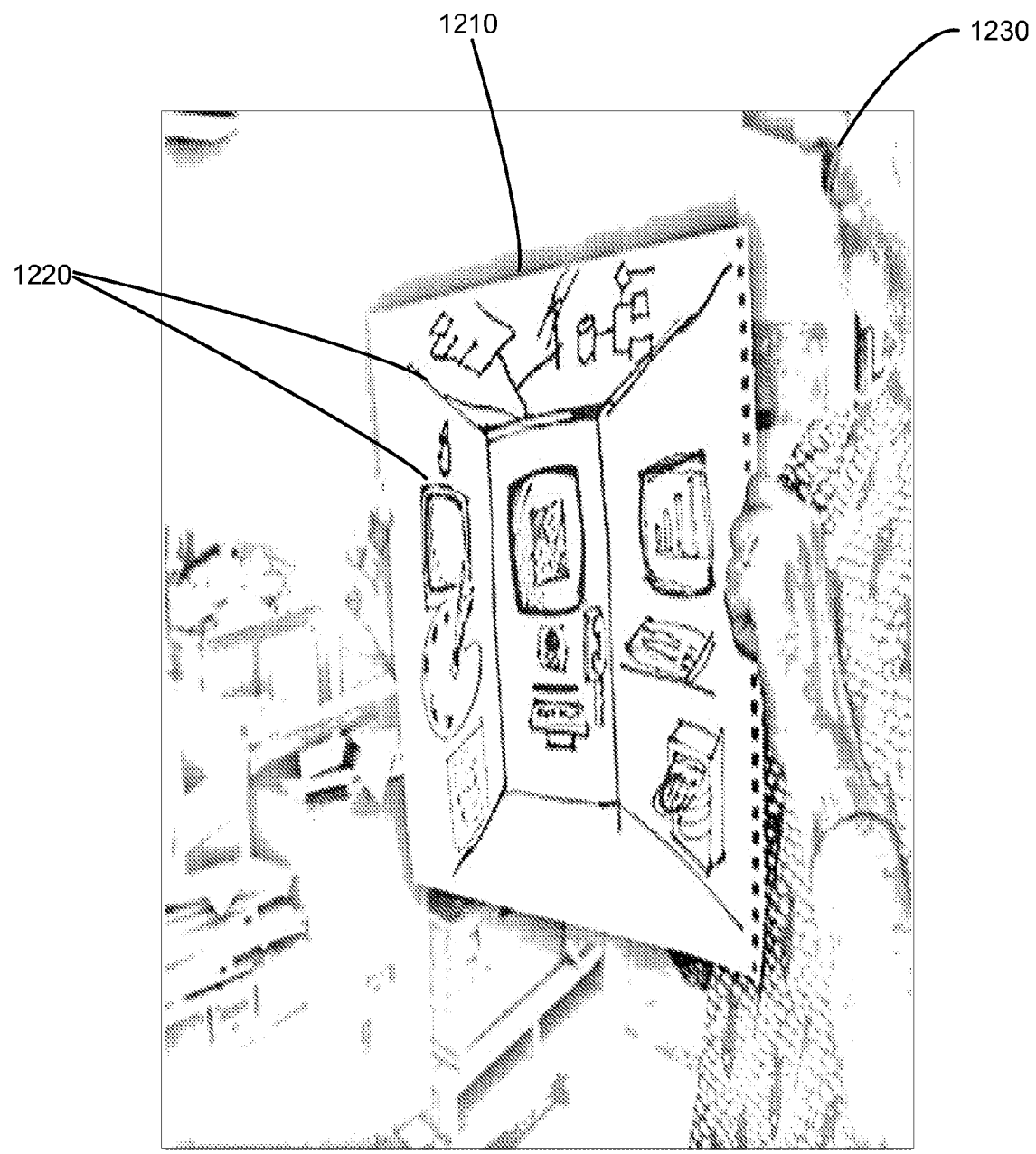
FIG. 12A shows an example of a captured image of a white document having content and a background.

FIG. 12A shows an example of a captured image of a white document 1210 having content 1220 and a background 1230. The captured image of FIG. 12A has been enhanced by an image enhancement method known in the art. In the example of FIG. 12A, the white document and the drawings sketched on the white document (content) comprises the substance of the captured image, whereas the person holding the white document and the various items around the white document are part of the unnecessary background of the captured image.

Figure 12B:
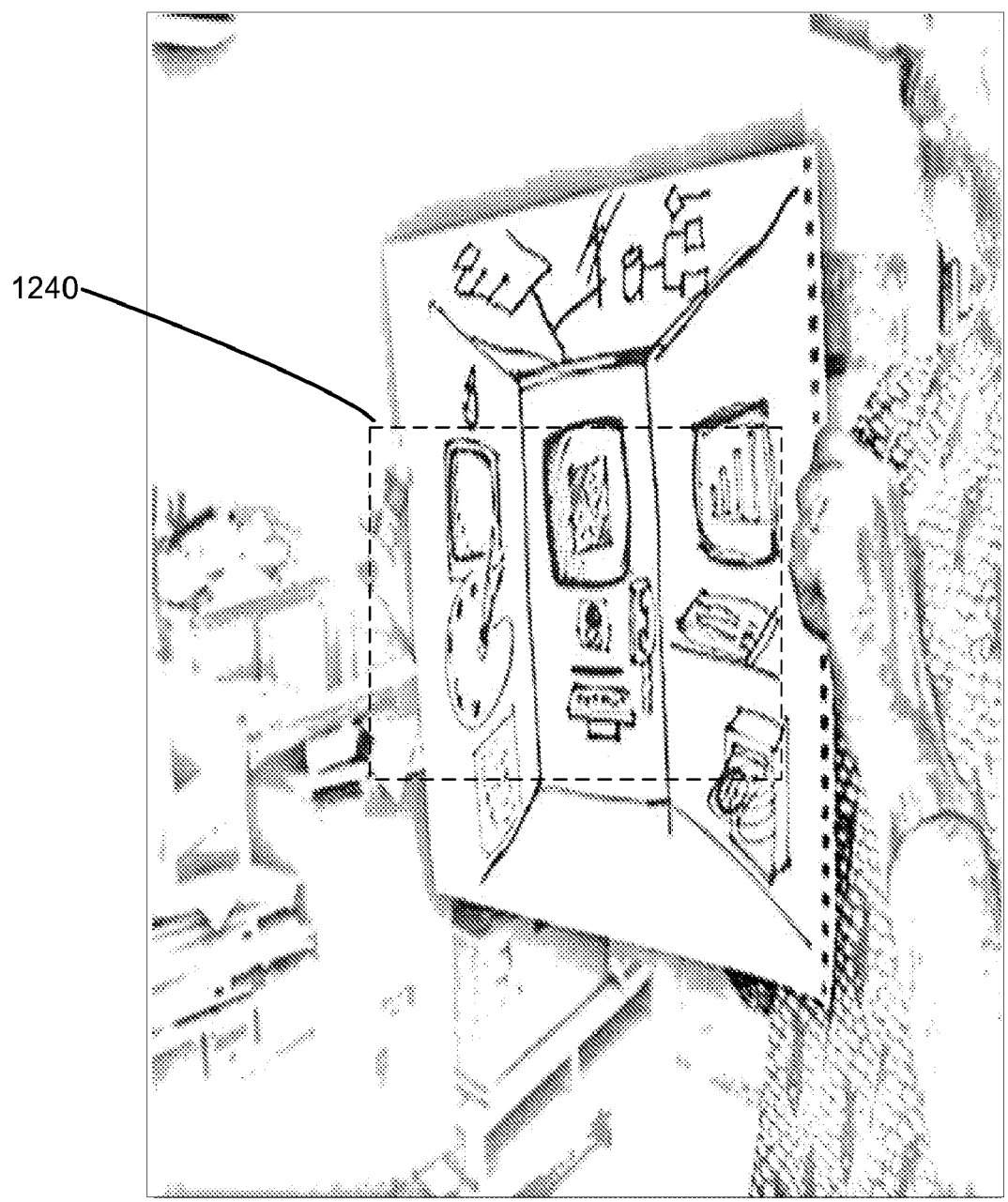
FIG. 12B shows the captured image of FIG. 12A having a portion of interest.

FIG. 12B shows the captured image of FIG. 12A having a portion of interest 1240. Color component values of pixels within the portion of interest 1240 are used to determine a set of representative values to represent the portion of interest. In the example of FIG. 12B, the portion of interest 1240 is centered within the captured image (has the same center point as the captured image).

Figure 12C:
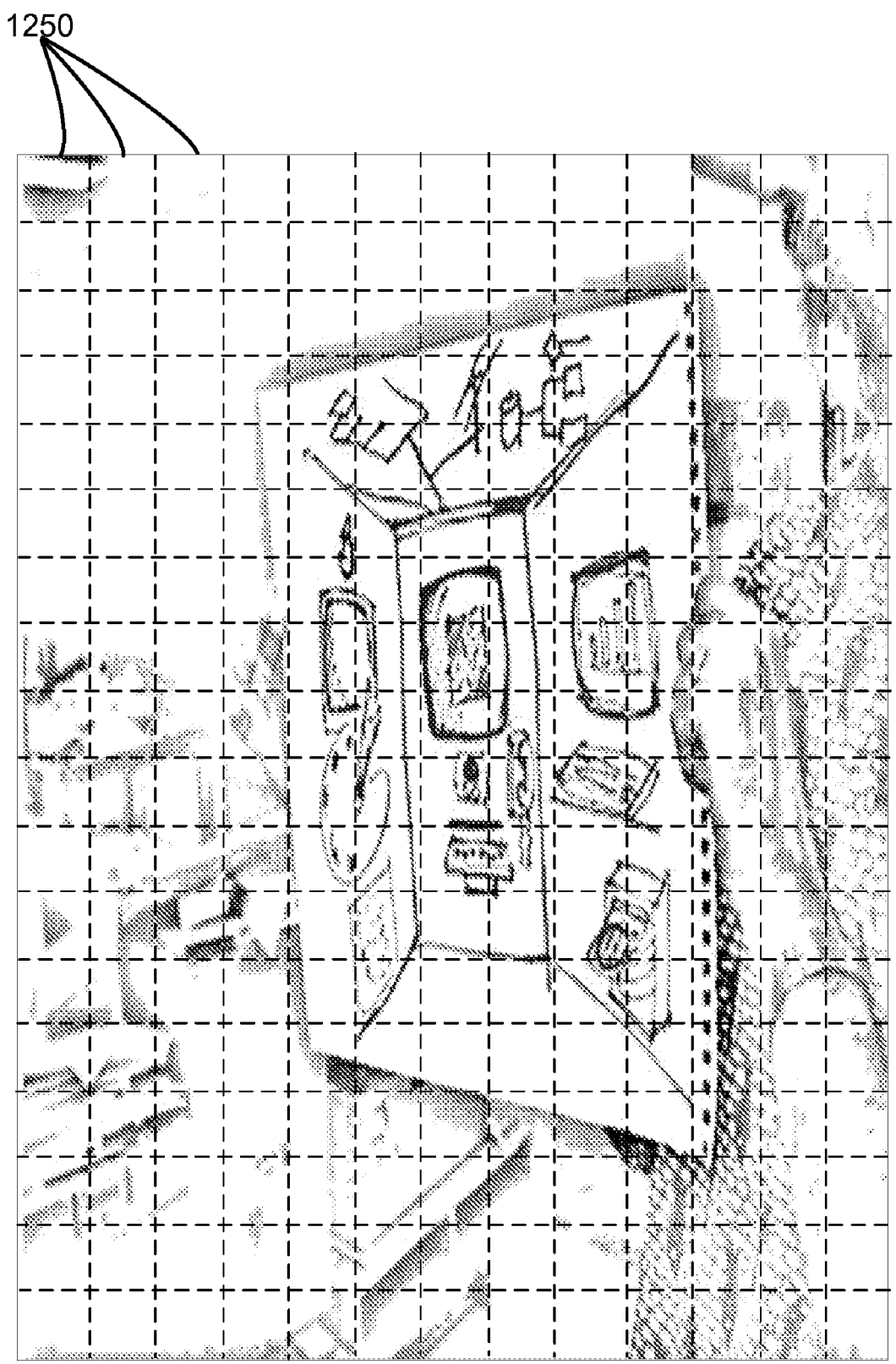
FIG. 12C shows the captured image of FIG. 12A being into a plurality of sub-blocks.

FIG. 12C shows the captured image of FIG. 12A being divided into a plurality of sub-blocks 1250. Each sub-block may be analyzed to determine whether it contains a predetermined minimum number of similar pixels. If so, the sub-block is determined to be part of the medium image and is no longer processed. If not, the sub-block is determined to be part of the background image and can be removed/altered without affecting the substance of the captured image.

Figure 12D:
FIG. 12D shows the captured image of FIG. 12A where much of the background image has been removed.

FIG. 12D shows the captured image of FIG. 12A where much of the background image 1230 has been removed/altered. In the example of FIG. 12D, the pixels of sub-blocks determined to be part of the background image have been modified to produce the color white.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user device. In the alternative, the processor and the storage medium may reside as discrete components in a user device.

The previous description of the disclosed embodiments is provided to enable any person skilled in the art to make or use the embodiments described herein. Various modifications to these embodiments will be readily apparent to those skilled in the art, and the generic principles defined herein may be applied to other embodiments without departing from the spirit or scope of the embodiments described herein. Thus, the embodiments are not intended to be limited to the specific embodiments shown herein but is to be accorded the widest scope consistent with the principles and novel features disclosed herein.

What is claimed is:

1. A method for processing a captured image comprising a plurality of sub-blocks of pixels having one or more components, the method comprising:
determining, with an image processing device, a first representative value based on first component values of pixels within a portion of interest in the captured image;
with the image processing device, determining, for at least one sub-block in the captured image, whether a predetermined minimum number of similar pixels are in the at least one sub-block, a similar pixel having a first component value within a first predetermined threshold of the first representative value; and
setting, with the image processing device, the first component value of pixels within the at least one sub-block to a first predetermined value if there is not the predetermined minimum number of similar pixels in the at least one sub-block.

2. The method of claim 1, wherein:
the captured image further comprises a medium image and a background image;
the medium image comprises an image of a whiteboard, blackboard, or document; and
the medium image contains content comprising text or lines.

3. The method of claim 1, wherein the first representative value comprises the median or average of first component values of pixels within the portion of interest.

4. The method of claim 1, wherein the portion of interest is centered within the captured image.

5. The method of claim 1, wherein the portion of interest is not centered within the captured image.

6. The method of claim 1, wherein the position or dimensions of the portion of interest relative to the captured image is specified by a user.

7. The method of claim 1, wherein the predetermined minimum number of similar pixels is one or higher.

8. The method of claim 1, wherein setting the first component value of pixels within the at least one sub-block to a first predetermined value comprises setting the first component value of pixels within the at least one sub-block to equal the first representative value.

9. The method of claim 1, wherein setting the first component value of pixels within the at least one sub-block to a first predetermined value comprises setting the pixels within the at least one sub-block to a predetermined color.

10. The method of claim 1, further comprising:
   determining a second representative value based on second component values and a third representative value based on third component values of pixels within the portion of interest in the captured image, wherein a similar pixel further has a second component value within a second predetermined threshold of the second representative value and a third component value within a third predetermined threshold of the third representative value; and
   setting the second component value of pixels within the at least one sub-block to a second predetermined value and the third component value of pixels within the at least one sub-block to a third predetermined value if there is not the predetermined minimum number of similar pixels in a sub-block.

11. The method of claim 10, wherein the pixels of the captured image have components (Y,Cb,Cr).

12. An apparatus for processing a captured image comprising a plurality of sub-blocks of pixels having one or more components, the apparatus comprising:
   an image processing module configured for:
      determining a first representative value based on first component values of pixels within a portion of interest in the captured image;
      determining, for at least one sub-block in the captured image, whether a predetermined minimum number of similar pixels are in the at least one sub-block, a similar pixel having a first component value within a first predetermined threshold of the first representative value; and
      setting the first component value of pixels within the at least one sub-block to a first predetermined value if there is not the predetermined minimum number of similar pixels in the at least one sub-block.

13. The apparatus of claim 12, wherein:
   the captured image further comprises a medium image and a background image;
   the medium image comprises an image of a whiteboard, blackboard, or document; and
   the medium image contains content comprising text or lines.

14. The apparatus of claim 12, wherein the first representative value comprises the median or average of first component values of pixels within the portion of interest.

15. The apparatus of claim 12, wherein the portion of interest is centered within the captured image.

16. The apparatus of claim 12, wherein the portion of interest is not centered within the captured image.

17. The apparatus of claim 12, wherein the position or dimensions of the portion of interest relative to the captured image is specified by a user.

18. The apparatus of claim 12, wherein the predetermined minimum number of similar pixels is one or higher.

19. The apparatus of claim 12, wherein the image processing module is configured to set the first component value of pixels within the at least one sub-block to a first predetermined value by setting the first component value of pixels within the at least one sub-block to equal the first representative value.

20. The apparatus of claim 12, wherein the image processing module is configured to set the first component value of pixels within the at least one sub-block to a first predetermined value by setting the pixels within the at least one sub-block to a predetermined color.

21. The apparatus of claim 12, wherein the image processing module is further configured for:
   determining a second representative value based on second component values and a third representative value based on third component values of pixels within the portion of interest in the captured image, wherein a similar pixel further has a second component value within a second predetermined threshold of the second representative value and a third component value within a third predetermined threshold of the third representative value; and
   setting the second component value of pixels within the at least one sub-block to a second predetermined value and the third component value of pixels within the at least one sub-block to a third predetermined value if there is not the predetermined minimum number of similar pixels in a sub-block.

22. The apparatus of claim 21, wherein the pixels of the captured image have components (Y,Cb,Cr).

23. The apparatus of claim 12, further comprising:
   an image capturing device configured for capturing images, wherein the apparatus comprises a camera, a document facsimile reading apparatus, a photocopy machine, a business card reader, a bar code scanner, or a document scanner.

24. The apparatus of claim 12, further comprising:
   a mobile communication processor configured for transmitting a processed image via a wireless connection, wherein the apparatus comprises a mobile communications device having a camera.

25. A computer readable storage medium comprising instructions that cause a processor to process a captured image comprising a plurality of sub-blocks of pixels having one or more components, the instructions further causing the processor to:
   determine a first representative value based on first component values of pixels within a portion of interest in the captured image;
   determine, for at least one sub-block in the captured image, whether a predetermined minimum number of similar pixels are in the at least one sub-block, a similar pixel having a first component value within a first predetermined threshold of the first representative value; and
   set the first component value of pixels within the at least one sub-block to a first predetermined value if there is not the predetermined minimum number of similar pixels in the at least one sub-block.

26. The computer readable storage medium of claim 25, wherein:
   the captured image further comprises a medium image and a background image;
   the medium image comprises an image of a whiteboard, blackboard, or document; and
   the medium image contains content comprising text or lines.

27. The computer readable medium of claim claim 25, wherein the first representative value comprises the median or average of first component values of pixels within the portion of interest.

28. The computer readable storage medium of claim 25, wherein the instructions further cause the processor to:
   determine a second representative value based on second component values and a third representative value based on third component values of pixels within the portion of interest in the captured image, wherein a similar pixel further has a second component value within a second predetermined threshold of the second representative value and a third component value within a third predetermined threshold of the third representative value; and set the second component value of pixels within the at least one sub-block to a second predetermined value and the third component value of pixels within the at least one sub-block to a third predetermined value if there is not the predetermined minimum number of similar pixels in a sub-block.

29. The computer readable storage medium of claim 28, wherein the pixels of the captured image have components (Y,Cb,Cr).

30. An apparatus configured for processing a captured image comprising a plurality of sub-blocks of pixels having one or more components, the apparatus comprising:
   means for determining a first representative value based on first component values of pixels within a portion of interest in the captured image;
   means for determining, for at least one sub-block in the captured image, whether a predetermined minimum number of similar pixels are in the at least one sub-block, a similar pixel having a first component value within a first predetermined threshold of the first representative value; and
   means for setting the first component value of pixels within the at least one sub-block to a first predetermined value if there is not the predetermined minimum number of similar pixels in the at least one sub-block.

31. The apparatus of claim 30, wherein:
   the captured image further comprises a medium image and a background image;
   the medium image comprises an image of a whiteboard, blackboard, or document; and
   the medium image contains content comprising text or lines.

32. The apparatus of claim 30, wherein the first representative value comprises the median or average of first component values of pixels within the portion of interest.

33. The apparatus of claim 30, further comprising:
   means for determining a second representative value based on second component values and a third representative value based on third component values of pixels within the portion of interest in the captured image, wherein a similar pixel further has a second component value within a second predetermined threshold of the second representative value and a third component value within a third predetermined threshold of the third representative value; and
   means for setting the second component value of pixels within the at least one sub-block to a second predetermined value and the third component value of pixels within the at least one sub-block to a third predetermined value if there is not the predetermined minimum number of similar pixels in a sub-block.

34. The apparatus of claim 33, wherein the pixels of the captured image have components (Y,Cb,Cr).

* * * * *

UNITED STATES PATENT AND TRADEMARK OFFICE
CERTIFICATE OF CORRECTION

| | |
|---|---|
| PATENT NO. | : 7,724,947 B2 |
| APPLICATION NO. | : 11/533692 |
| DATED | : May 25, 2010 |
| INVENTOR(S) | : Forutanpour |

It is certified that error appears in the above-identified patent and that said Letters Patent is hereby corrected as shown below:

Column 12, line 54, claim 27: "claim claim 25" to read as --claim 25--

Signed and Sealed this
Fifth Day of July, 2011

David J. Kappos
*Director of the United States Patent and Trademark Office*